(12) United States Patent
Pensjö et al.

(10) Patent No.: US 7,305,215 B2
(45) Date of Patent: Dec. 4, 2007

(54) RADIO LINK CHECK

(75) Inventors: Tomas Pensjö, Järfälla (SE); Bo Lindell, Lidingö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 0 days.

(21) Appl. No.: 10/572,508

(22) PCT Filed: Aug. 25, 2004

(86) PCT No.: PCT/EP2004/009487

§ 371 (c)(1),
(2), (4) Date: Mar. 17, 2006

(87) PCT Pub. No.: WO2005/029735

PCT Pub. Date: Mar. 31, 2005

(65) Prior Publication Data

US 2007/0004442 A1 Jan. 4, 2007

(30) Foreign Application Priority Data

Sep. 19, 2003 (EP) .................. 03021260

(51) Int. Cl.
*H04B 17/00* (2006.01)
(52) U.S. Cl. ................. 455/67.7; 455/67.11; 455/63.1; 455/70; 455/522
(58) Field of Classification Search ................. 455/423, 455/67.11, 67.12, 67.14, 115.1, 115.2, 226.1, 455/67.7, 63.1, 70, 522
See application file for complete search history.

(56) References Cited

U.S. PATENT DOCUMENTS

| 3,683,116 | A | * | 8/1972 | Dill ............................ 370/321 |
| 4,184,118 | A | * | 1/1980 | Cannalte et al. ............ 370/345 |
| 5,482,036 | A | * | 1/1996 | Diab et al. .................. 600/364 |
| 6,122,271 | A | * | 9/2000 | McDonald et al. ......... 370/345 |
| 6,266,527 | B1 | | 7/2001 | Mintz ......................... 455/423 |
| 6,493,333 | B1 | * | 12/2002 | Kim et al. .................. 370/342 |
| 2001/0046867 | A1 | | 11/2001 | Mizoguchi | |

FOREIGN PATENT DOCUMENTS

WO WO 01/24418 4/2001

* cited by examiner

*Primary Examiner*—Nay Maung
*Assistant Examiner*—Dominic E. Rego
(74) *Attorney, Agent, or Firm*—Harrity Snyder, LLP

(57) ABSTRACT

The present invention is directed towards a method, a link check device, and a portable communication device for communication link check. The link check device (102) comprises a receiver unit (104) for receiving and monitoring information including a power control signal from a base station on a first link (109). A first and second signal generating unit (110, 112) connected to said receiver unit (104) provide a first and second noise signal ($R_1$, $R_2$), which are transmitted to a combining unit (114) to provide a third signal representing signal ($R_3$) strength for communication links.

18 Claims, 2 Drawing Sheets

RADIO LINK CHECK

This application claims priority under 35 U.S.C. § 119 based on U.S. Provisional Application Ser. No. 60/506,349 filed on Sep. 26, 2003, the disclosure of which is incorporated herein by reference.

TECHNICAL FIELD OF THE INVENTION

The present invention relates to radio link check in a portable communication device. More particularly it relates to a method and a device for radio link check in a portable communication device for a user to be able to choose a more favourable location for radio link connection.

BACKGROUND

It is well known that in radio communication systems including base stations and mobile terminals communicating with each other on radio links, calls typically in fringe areas can be lost due to bad radio link preformace, in some cases even without a warning to a user, which of course causes problems, or at least irritation to the user of a mobile terminal. Often, it is not possible for the user to select a location which has better radio conditions, whereby radio link performance is just a matter of coincidence.

DESCRIPTION OF RELATED ART

There are several conventional techniques for selecting a location with better radio conditions. For example, base station strength, i.e. the strength of the radio link from the base station to the mobile terminal is often shown graphically on a display of the mobile terminal. The base station signal strength indicates a so-called "down-link" connection, which unfortunately is normally of little help where coverage is bad, since the radio link from the mobile terminal up to the base station, the so-called "up-link" is often the weakest link, i.e. the real cause of the bad radio link performance. Therefore, the known solution only taking the down-link signal strength in account to select better radio conditions is not satisfactory.

There is thus a need to secure a better determination associated with radio conditions.

SUMMARY OF INVENTION

Aspects described herein are directed towards determining radio signal strength.

Aspects described herein may use both down-link and uplink signal strength to provide determination of better radio conditions.

One aspect provides a method for communication link check using both down-link and uplink signal strength.

According to a first aspect, a method for communication link check in a portable communication device comprises the steps of: receiving information including power control commands from a base station on a first link; monitoring said first link for base station signal strength and power control commands; providing a first signal strength representation signal based on base station signal strength; providing a second signal strength representation signal based on the power control commands; and combining said first and second representation signals to provide a third signal strength representation signal which is transmitted to a user presentation unit for communication link check.

Thus, aspects described herein provide signal strength representation using both the down-link as well as the uplink, which improves determination of actual signal strength including also the weakest link.

A second aspect of the present invention is directed towards a method including the features of the first aspect, in which the said first and second signal strength representation signals are noise signals.

A third aspect of the present invention is directed towards a method including the features of the first aspect, in which the step of combining said first and second signal strength representation signals includes adding said noise signals.

A fourth aspect of the present invention is directed towards a method including the features of any one of the first aspect to the third aspect, including the step wherein the third signal is transmitted as audible noise to a user audio output.

A fifth aspect of the present invention is directed towards a method including the features of the fourth aspect wherein the third signal is presented visually as well.

Another aspect provides a communication link check device for a portable communication device, that easily enables a user to find a location having better radio conditions.

According to a sixth aspect of the present invention a communication link check device for a portable electronic device device comprises: a receiver unit provided for receiving information including a power control signal from a base station on a first link; a monitoring unit connected to said receiver unit for monitoring said first link for base station signal strength and power control; a first signal generating unit connected to said receiver unit, said first signal generating unit being arranged to provide a first signal strength representation signal based on the base station signal strength; a second signal generating unit connected to said receiver unit, said second signal generating unit being arranged to provide a second signal strength representation signal based on the power control signal; a combining unit connected to said first and second signal generating units arranged to combine the first and second signal strength representation signals to a third signal strength representation signal; and a control unit connected to the receiver unit, first and second signal generating units and combining unit for control thereof and being arranged to provide the third signal to a user presentation unit for communication link check.

A seventh aspect of the present invention is directed towards a communication link check device comprising the features of the sixth aspect, wherein the first first and second signal generating units are noise generating units.

An eight aspect of the present invention is directed towards a communication link check device comprising the features of the sixth or the seventh aspect, wherein the user presentation unit is an audio user output and/or a visual user presentation unit.

According to a ninth aspect of the present invention, there is provided a portable communication device comprising:
  a communication link check device for a portable electronic device device, said communication link check device comprising:
    a receiver unit provided for receiving information including a power control signal from a base station on a first link;
    a monitoring unit connected to said receiver unit for monitoring said first link for base station signal strength and power control;

a first signal generating unit connected to said receiver unit, said first signal generating unit being arranged to provide a first signal strength representation signal based on the base station signal strength;

a second signal generating unit connected to said receiver unit, said second signal generating unit being arranged to provide a second signal strength representation signal based on the power control signal;

a combining unit connected to said first and second signal generating units arranged to combine the first and second signal strength representation signals to a third signal strength representation signal; and a control unit connected to the receiver unit, first and second signal generating units and combining unit for control thereof and being arranged to provide the third signal to a user presentation unit for communication link check.

A tenth aspect of the present invention is directed towards a portable communication device, wherein the device is a cellular phone, a smart phone or a PDA.

Aspects described herein provide, among other things the, following advantages over the state of the art:

Firstly, by also using the power control signal transmitted from the base station to the mobile station, the uplink, which is typically the weakest link, is also monitored so that a user can find a better location having better radio conditions. The power control signal can be used to represent the uplink radio conditions, since this signal is depending on the transmission on the uplink. The base station instructs the mobile station to increase or decrease transmission power.

Secondly, since a better location can be found with sufficent up- and downlinks, transmit power in the portable electronic device can be less to save battery, as well as reduce interference on neighboring channels.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF THE EMBODIMENTS

Figure 1:
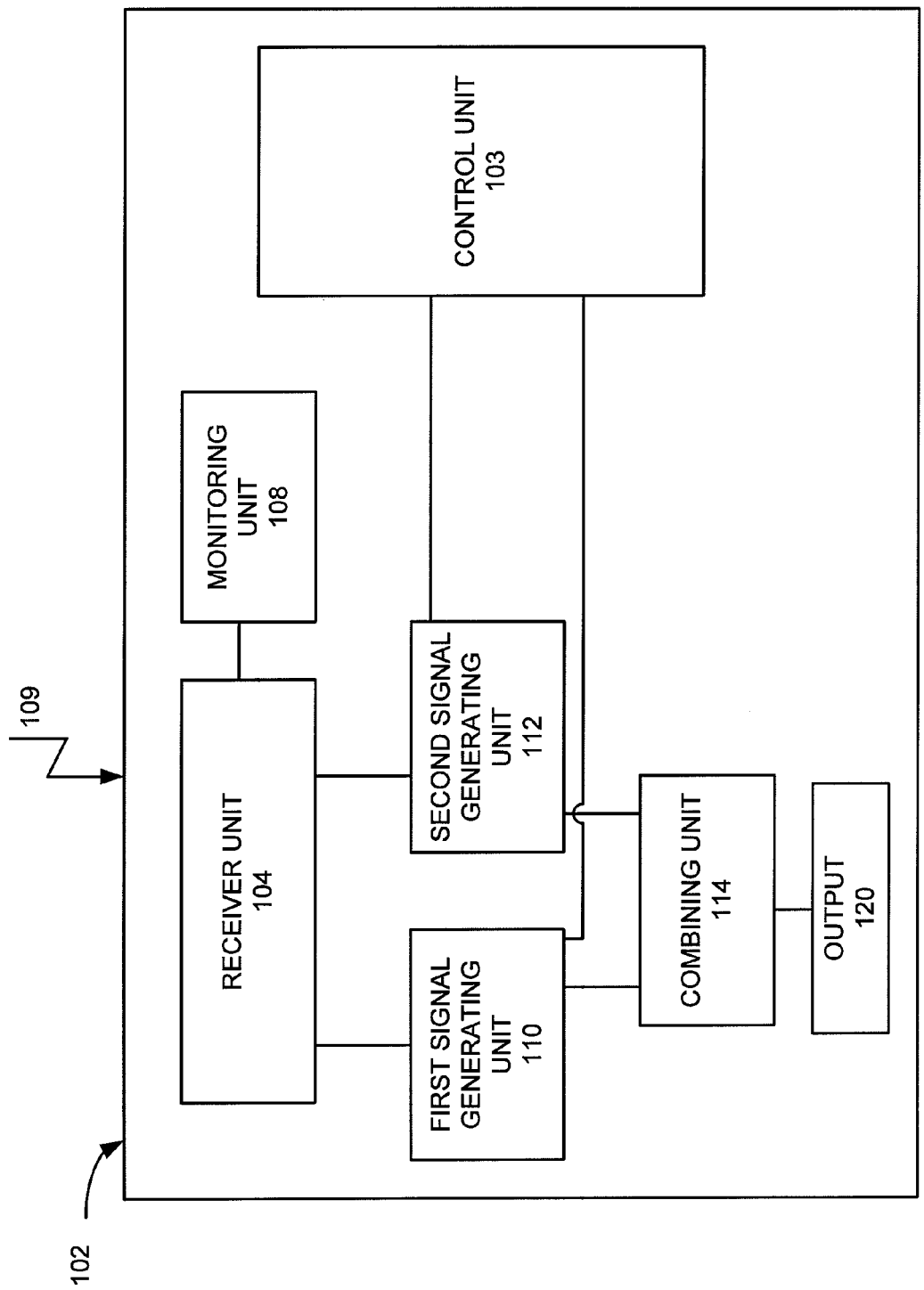
FIG. 1 shows a communication link check device for a portable communication device.

Reference will now be given to FIG. 1 showing a communication link cheek device according to one preferred embodiment of the invention. In this figure, the communication link check device 102 is controlled by a control unit 103 included in said communication link check device 102. Said communication link check device 102 also comprises a receiver unit 104 provided for communication with a base station (not shown). The communication link check device 102 also includes a monitoring unit 108 for monitoring a first link 109 for base station signal strength and power control commands, and is connected to or located within the receiver unit 104. The communication link check device 102 further comprises a first signal strength representation signal generating unit 110 connected to the receiver unit 104, preferably a first noise generating unit for providing a first signal strength representation signal $R_1$, preferably a first noise signal based on the base station signal strength. The communication link check device 102 further comprises a second signal strength representation signal generating unit 112 connected to the receiver unit 104, preferably a second noise generating unit for providing a second signal strength representation signal $R_2$, typically a second noise signal, based on conventional power control commands received from the base station. Furthermore, the communication link check device comprises a signal combining unit 114 for combining the first and second signal strength representation signals $R_1$ and $R_2$, i.e. in this embodiment the first and second noise signals to a third signal strength representation signal $R_3$ provided for link check, typically audible link check by means of transmitting the third signal strength representation signal $R_3$ to a user audio output 120.

Figure 2:
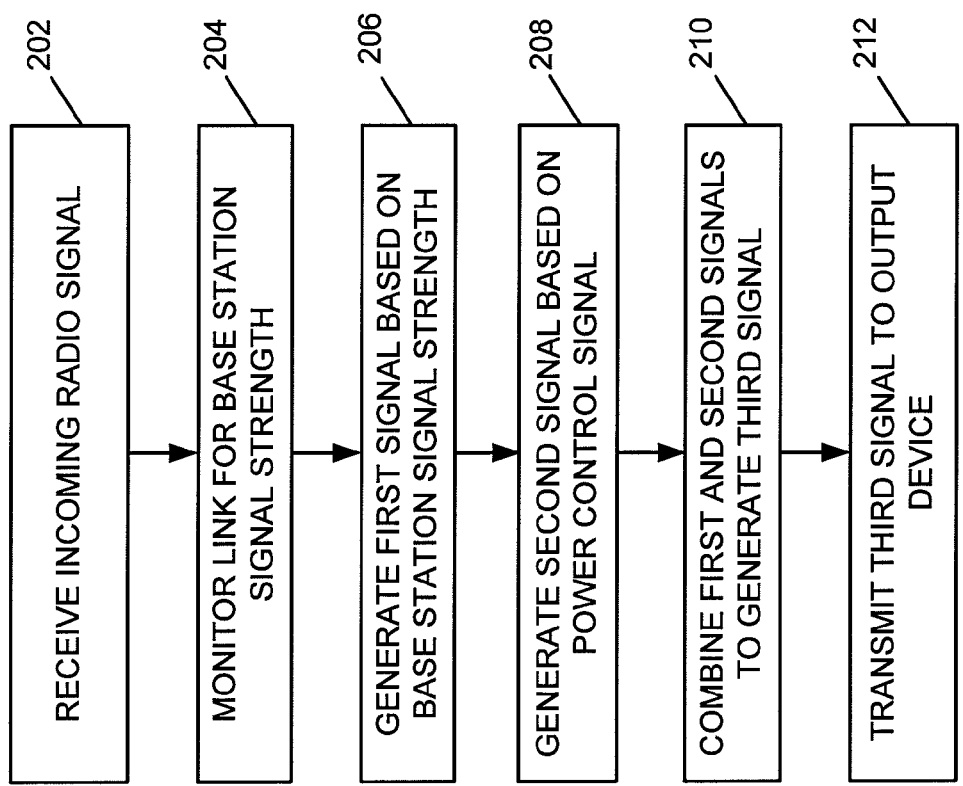
FIG. 2 shows a method for communication link check in a portable communication device.

FIG. 2 presents a flow-chart of one embodiment of a method for communication link check in a portable communication device. Reference will also be given to FIG. 1.

With reference to FIG. 1 and FIG. 2, the method for communication link check will now be explained. This method starts with receiving information associated with an incoming radio signal including a power control signal from a base station on a first link 109 (the so-called down-link), step 202, by means of a receiver unit 104, as shown in FIG. 1. It is assumed that the receiver unit 104 receives the radio signal and demodulates it in a conventional manner, which will therefore not be described in more detail herein. Thereafter, the monitoring unit 108 monitors the first link 109 for base station signal strength, step 204.

In the first signal generating unit 110, preferably a first noise generating unit connected to said receiver unit 104, the first signal strength representation signal $R_1$, preferably a first noise signal based on the base station signal strength is generated, step 206.

In the second signal generating unit 112, preferably a second noise generating unit connected to said receiver unit 104, the second signal strength representation signal, preferably a second noise signal based on the received power control signal, is generated, step 208. The power control signal is a conventional power control signal sent from the base station to the communication link control device for controlling transmitted up-link power, i.e. the signal from a portable communication device including the communication link check device according to the invention. The power control signal is received and decoded in a conventional manner, which will therefore not be described in more detail and can be transformed into a noise signal or other representation signal.

The noise generating units do not have to be separate units, but alternatively, they can be included in one unit only, provided that two signal strength representation signals can be generated. Also, they can be integrated with the receiver unit instead of being linked thereto as described.

In a signal combining unit 114, the first and second signal strength representation signals $R_1$, $R_2$ are combined, preferably added, step 210 to a third signal strength representation signal $R_3$. This third signal strength representation signal $R_3$ is transmitted to a user output provided for link check, step 212, preferably as an audible noise signal transmitted to the user of a portable communication device comprising the link check device according to the invention.

In this way, noise will appear to a user as receiver noise comparable to prior analog systems (for instance NMT 450) in which a user could hear noise decreasing when he/she moved to a more favourable location as regards radio signal conditions. However, also in prior analog systems only down-link noise could be heard, which as described earlier is often of little help since the up-link is typically the weakest point.

Alternatively, according to another embodiment of the invention, the third signal $R_3$ representing overall signal strength of both down-link as well as uplink can be presented for the user in some other way than as an audible noise signal. For instance, some visual means may be provided instead or as a complement to the audible representation, even if this solution is typically less suitable for the user than the audible alternative which is preferred.

According to a preferred embodiment of the invention, the portable communication device, comprising the link check device is a cellular telephone, a smart-phone or a PDA.

The invention is characterised in that both uplink as well as down-link transmission are monitored to help the user to find a better location having both links optimised. Of course, if conditions are too bad, even moving from one location to another might not help, but nevertheless in most or at least many situations the invention will help the user to find a better location. An example could be a situation where the user has a headset connected to a cellular phone, whereby he/she can move the cellular phone just a little bit to improve radio conditions. Besides improving radio conditions, the invention is also applicable to save battery as a consequence of less transmitting power required for the uplink. Thus, a user can use this invention to save battery as well.

Other situations when the invention may not be able to help the user are for instance fast fading conditions such as those that occurs during driving typically at high speed. In these cases, radio conditions change too fast. In a embodiment of the invention additional circuits are added to inhibit the function according to the invention in those conditions. Thus, the invention is most suitable for a user standing still, but is not limited to this.

According to the above described embodiment of the present invention radio communication between the base station and the mobile is effected typically using TDMA/FDMA. However, this is by no means intended to limit the invention in any sense, since communication could also be effected for instance by means of CDMA or any other suitable technique. In the following, the term "down-link" refers to the radio transmission of information bearing signals from the base station to the mobile station. Similarly, the term "uplink", refers to the radio transmission of information bearing signals from the mobile stations to the base station.

It is emphasized that this invention can be varied in many ways, of which the alternative embodiments below only are examples of a few. These different embodiments are hence non-limiting examples. The scope of this present invention, however, is only limited by the subsequently following patent claims.

The portable communication device can be any one of a variety of device like a personal digital assistant (PDA), a cellular phone.

The invention claimed is:

1. A method for communication link check in a portable communication device, said method comprising:
    receiving information including power control commands from a base station on a first link;
    monitoring said first link for base station signal strength and power control commands;
    providing a first signal strength representation signal based on base station signal strength;
    providing a second signal strength representation signal based on a power control command;
    combining said first and second signal strength representation signals to generate a third signal strength representation signal; and
    transmitting the third signal strength representation signal to an output unit for communication link check.

2. The method of claim 1, wherein said first and second signal strength representation signals are noise signals.

3. The method of claim 2, wherein the step of combining said first and second signal strength representation signals includes adding said noise signals.

4. The method of claim 2, further comprising:
    outputting, by the output unit, audible output corresponding to the third signal strength representation signal.

5. The method of claim 1, wherein said third signal is audibly provided via an audio output of the output unit.

6. The method of claim 5, wherein said third signal is presented visually.

7. The method of claim 1, further comprising:
    outputting, by the output unit, audible output corresponding to the third signal strength representation signal.

8. A communication link check device for a portable electronic device, said communication link check device comprising:
    a receiver unit configured to receive information including a power control signal from a base station on a first link;
    a monitoring unit connected to said receiver unit for monitoring said first link for base station signal strength and power control;
    a first signal generating unit connected to said receiver unit, said first signal generating unit being configured to provide a first signal strength representation signal based on the base station signal strength;
    a second signal generating unit connected to said receiver unit, said second signal generating unit being configured to provide a second signal strength representation signal based on the power control signal;
    a combining unit connected to said first and second signal generating units and configured to combine the first and second signal strength representation signals to form a third signal strength representation signal; and
    a control unit connected to the receiver unit, first and second signal generating units and combining unit and being configured to provide the third signal strength representation signal to a presentation unit for communication link check.

9. The communication link check device according to claim 8, wherein said first and second signal generating units are noise generating units.

10. The communication link check device according to claim 9, further comprising the presentation unit, the presentation unit being configured to provide the third signal strength representation signal via an audio output or a visual output.

11. The communication link check device according to claim 8, further comprising the presentation unit, the presentation unit being configured to provide the third signal strength representation signal via at least one of an audio output or a visual output.

12. The communication link check device according to claim 11, wherein the presentation unit is configured to provide the third signal strength representation signal via the audio output.

13. The communication link check device of claim 8, wherein when combining the first and second signal strength representation signals, the combining unit is configured to add the first and second signal strength representation signals.

14. A portable communication device comprising:
a communication link check device for a portable electronic device, said communication link check device comprising:
a receiver unit provided for receiving configured to receive information including a power control signal from a base station on a first link;
a monitoring unit connected to said receiver unit and configured to monitor said first link for base station signal strength and power control;
a first signal generating unit connected to said receiver unit, said first signal generating unit being configured to provide a first signal strength representation signal based on the base station signal strength;
a second signal generating unit connected to said receiver unit, said second signal generating unit being configured to provide a second signal strength representation signal based on the power control signal;
a combining unit connected to said first and second signal generating units and configured to combine the first and second signal strength representation signals to provide a third signal strength representation signal; and
a control unit connected to the receiver unit, first and second signal generating units and combining unit and being configured to provide the third signal strength representation signal to a user presentation an output unit for communication link check.

15. The portable communication device according to claim 14, wherein the portable communication device is a cellular telephone.

16. The portable communication device of claim 14, further comprising the output unit, the output unit being configured to receive the third signal strength representation signal and output an audible sound based on the third signal strength representation signal.

17. The portable communication device of claim 16, wherein the output unit is further configured to output a visual signal corresponding to the third signal strength representation signal.

18. The portable communication device of claim 14, wherein when combining the first and second signal strength representation signals, the combining unit is configured to add the first and second signal strength representation signals.

* * * * *

UNITED STATES PATENT AND TRADEMARK OFFICE
CERTIFICATE OF CORRECTION

PATENT NO. : 7,305,215 B2  Page 1 of 1
APPLICATION NO. : 10/572508
DATED : December 4, 2007
INVENTOR(S) : Tomas Pensjö et al.

It is certified that error appears in the above-identified patent and that said Letters Patent is hereby corrected as shown below:

In Claim 14, Column 7, Line 10, please delete the words "provided for receiving" before the word "configured."

In Claim 14, Column 8, Line 4, please delete the words "a user presentation" before the word "an."

Signed and Sealed this

Twenty-ninth Day of April, 2008

JON W. DUDAS
*Director of the United States Patent and Trademark Office*